Dec. 19, 1922.

R. W. ELAND.
SPRING TIRE.
FILED DEC. 12, 1919.

REINHARD W. ELAND
INVENTOR.

PER [signature]
ATTORNEY.

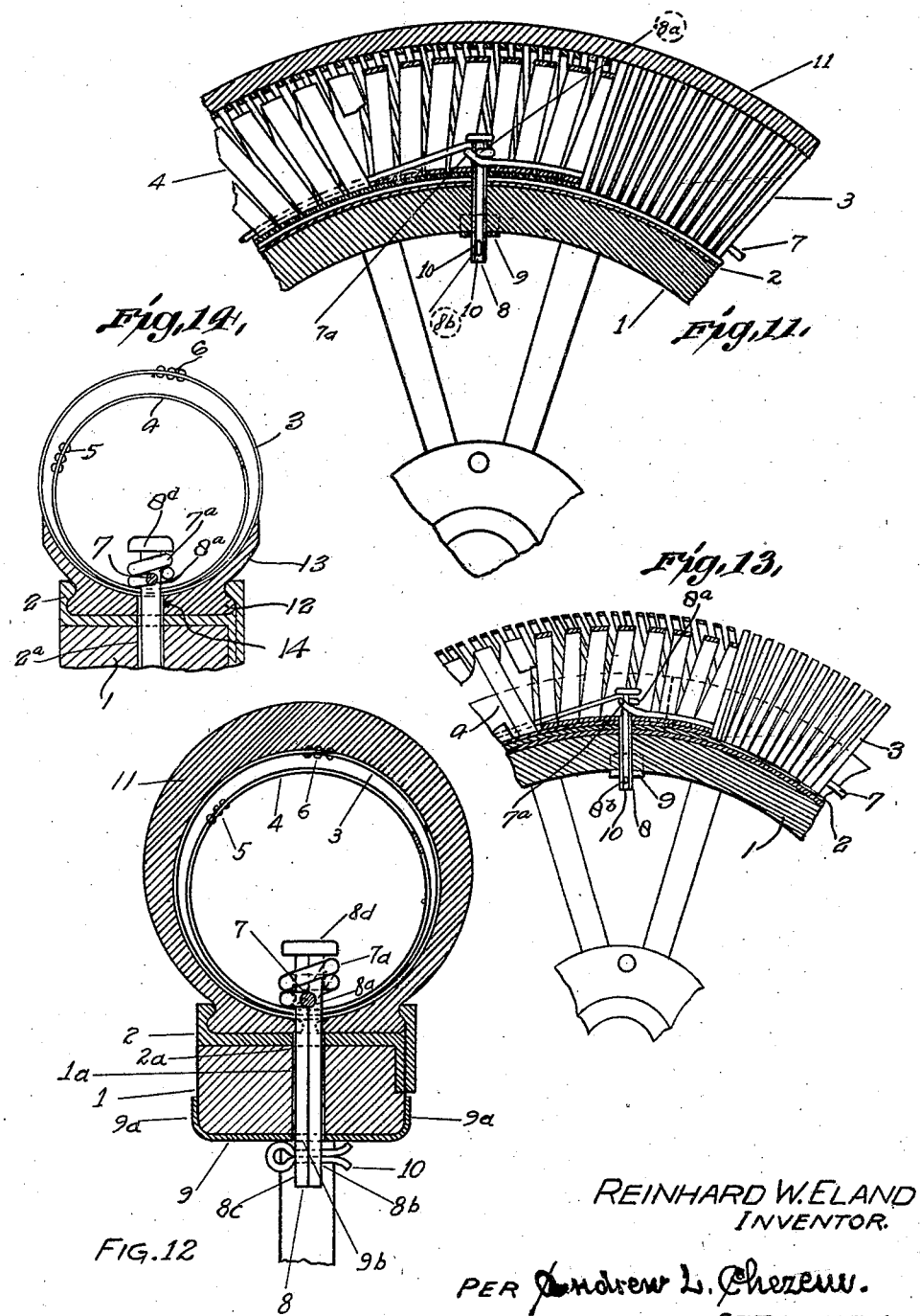

Patented Dec. 19, 1922.

1,439,077

UNITED STATES PATENT OFFICE.

REINHARD W. ELAND, OF DAVENPORT, IOWA.

SPRING TIRE.

Application filed December 12, 1919. Serial No. 344,311.

*To all whom it may concern:*

Be it known that I, REINHARD W. ELAND, a citizen of the United States, residing at Davenport, in the county of Scott, in the State of Iowa, have invented a new and useful Improvement in Spring Tires, of which the following is a specification.

My invention relates to improvements in spring tires for vehicles in which coil springs are circularly mounted upon the metal rim of a vehicle either enclosedly within a casing or uncovered and the objects of my invention are; to provide a resilient tire for vehicles without the use of air; at the same time elastic, durable and of metal, yet having strength and symmetry of form; also capable of effectual responsive adaptation to light and heavy loads under varying road conditions; also to provide a means of securing the coil springs upon the metal rim of a vehicle; also to provide spring tires adaptable to use naked or within a casing, and to provide a spring tire composed of coil springs, one within the other, in such manner as to constitute a noiseless tire, and to provide means of securing the coil springs upon the rim, and of tightening the same to any desired tension.

Other objects will be apparent from the description of the mechanism adapted.

I attain these objects by the mechanism illustrated in the accompanying drawings, in which:

Fig. 11, is a side elevation of a broken portion of a vehicle wheel showing the tire mounted within a casing, disclosing different parts in section and serving to illustrate the relation of the inner and outer springs, attaching cable, and the manner in which a tire is applied to a wheel rim when mounted within a tire casing.

Fig. 12, is a cross-sectional view of a portion of a vehicle wheel and a casing equipped with my invention.

Fig. 13, is a side elevation of a broken portion of a vehicle wheel showing the tire mounted without a casing, disclosing different parts in section, serving to illustrate the working of the inner and outer coils and the means of securing the same to the rim of a wheel, including a partly cut away section of the band brace, and the means for holding the tire on the rim.

Fig. 14, is a cross sectional view of a portion of the rim of a wheel disclosing in cross sectional view the band brace and pin means for holding the tire on the rim.

Similar numerals refer to similar parts throughout the several views.

Figure 1:
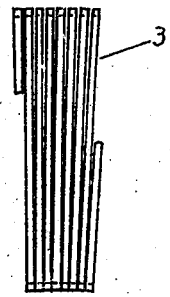
Figure 1, is a side elevation of a fragmentary portion of the outer spring.
Figure 2:
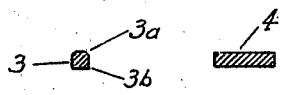
Fig. 2, is a cross section of the wire composing the outer spring.
Figure 4:
Fig. 4, is a cross section of the wire composing the inner spring.
Figure 3:
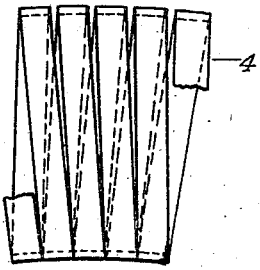
Fig. 3, is a side elevation of a fragmentary portion of the inner spring.
Figure 6:
Fig. 6, is a fragmentary portion of a cable.

The felly 1 in connection with the rim 2, constitute the groundwork upon which my spring tire, composed of an outer spiral spring 3, and an inner spiral spring 4, enclosed within a casing 11 is mounted.

Figure 5:
Fig. 5, is a side elevational view disclosing the union of the ends of the respective spiral springs shown in Figs. 1 and 3, in forming a circular tire.
Figure 9:
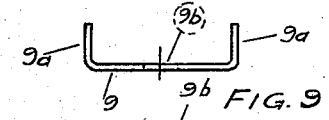
Fig. 9, is a side elevation of a lock washer.
Figures 7, 8, 10:
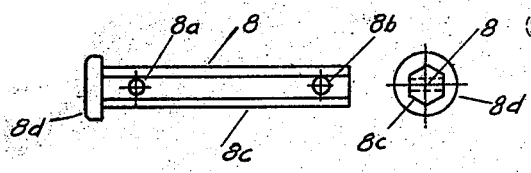
Fig. 7, is a side elevation of the key bolt.
Fig. 8, is an end view of the key bolt.
Fig. 10, is a top plan view of the lock washer.

In the construction of the spring tire, shown mounted in Fig. 11, 3 is a spring wire having its inside and its edges 3$^b$, right angular and having its outside 3$^a$ rounded, and in construction it is coiled into a spring conformable to the inside of a tire casing 11, or supported within the flanged edges 13 of a band brace 12, with its ends fastened together, by any suitable means, preferably as shown by 5—6 of Fig. 5, with result as shown in Fig. 12, in such manner as to form a spiral spring circularly bent conformable to the casing 11, and the rim 2, or the flanges 13 as desired, thus forming a circular coil spring, 4 is a ribbon spring having rectangular sides, and is much wider than spring 3, coiled, but with its coils diametrically suitably smaller than the coils of springs 3, the purpose being to permit said coil spring 4 to be inserted within coil spring 3, and to facilitate their coaction and prevent their entanglement with each other in use. The windings of coil spring 4 are directioned opposite to the windings of coil spring 3, the ends of coil spring 4 being secured to each other similarly to the manner in which the ends of coil spring 3 are fastened, 5—6, as shown in Figs. 5 and 12, in which I have shown them fastened by rivets, but this may be done in any manner effectual to solidly accomplish the result.

When the spring 4 is inserted within spring 3, and their respective ends secured as indicated at 5 and 6, the inside circumferences of each will snugly fit the other, leaving a space between their outside circumferences as shown in Fig. 12, with their coils counter-directional, as shown in Fig. 11, while, when they are inserted within a casing 11, the outer surface of spring 3 will be found to fit snugly within the casing 11, as shown in Figs. 11 and 12, with the inner spring 4 always bracing the outer spring 3 by compression.

Having inserted the inner spring 4 within the outer spring 3 and secured their respective ends, and mounted them upon the rim 2 of the wheel, either within the casing 11 or within brace band 12, I provide a strong pliable cable 7, and by stretching the coils of springs 3 and 4 respectively apart at adjacent points, I insert the cable 7, through the opening thus made, into the inner spring 4 and thread the same through the entire inner circumference of spring 4 leaving the ends of the said cable 7 protruding outward through the openings thus made, after which I thread one end of said cable 7 through an eye 8ª, of the key-bolt 8, after which I insert the head 8ᵈ of the key bolt 8 through the parted opening in springs 3 and 4, made by the protruding ends of cable 7 and draw the cable ends taut and tie them firmly, at the same time inserting the point of the said key bolt 8 through hole 1ª, of the felly, inwardly toward the center of the wheel, through hole 2ª of rim 2, and in case of using band brace 12, through hole 14 therein.

For securing the spring tire upon the vehicle wheel when the same is mounted thereon, I wind the cable 7 taut, as shown at 7ᵈ, by means of key bolt 8, by turning key bolt 8 with a wrench, and to better serve that purpose I have constructed the key bolt 8 with six sides 8ᶜ, and provided it with a head 8ᵈ to prevent the cable 7 from slipping off when being wound thereon, and to secure the key bolt 8 in wound position, and to further secure it in such position, I have provided a lock washer 9 having flanged arms 9ª suitable to fit saddle-like over the felly 1, said lock washer having a center hole 9ᵇ therein, provided with hexagon sides 9ᶜ suitable to be fitted over the key bolt 8, and when I have wound the key bolt 8 sufficiently taut I slip the lock washer 9 over the felly 1 and secure the same thereon by means of a cotter pin 10 inserted through a hole 8ᵇ, provided in the end of key bolt 8, thus completing the assembling and mounting process of my invention.

It is obvious that when spring 4 is inserted within spring 3 and their respective ends are secured as shown in Figs. 5 and 12, the same may be mounted upon band brace 12 secured upon felly 1, and secured upon said band brace and wheel by means of cable 7, key-bolt 8 and lock washer 9, as effectually without a casing as with one, and so may be used naked as shown in Fig. 13.

Band brace 12 is similar to the ordinary demountable rim, having its perimeter cut diagonal, and being provided with the ordinary latch and locking means not shown of a demountable rim and is secured upon felly 1 in the same manner as demountable rims now are, but its edges are provided with enlarged flanges and with the ordinary inner tube stem hole 14 in its center, its size being suitable to conform to the rim of the wheel upon which it is to be used, and the flanges 13 being sufficiently broad to hold and brace the sides of the spring tire when mounted thereon, and so to hold the said spring tire in place, as shown in Fig. 14.

I claim:

1. A spring tire comprising a pair of disconnected band coil spring members, one spring member being enclosed within the other, the band of the inner member being broader than the band of the outer member, the coils of said members being closely spaced with the coils of one member extending oppositely to those of the other member, the said spring tire being adapted to be secured on the rim of a vehicle wheel.

2. A spring tire comprising a continuous coil spring adapted to be secured on a vehicle wheel, and means for securing said coil spring on said vehicle wheel, said means comprising a cable adapted to extend around the wheel within the coil spring adjacent the inner periphery thereof, and a key belt hexagonal in cross section adapted to extend through the felly and rim of the vehicle wheel and into the coil spring and to which the ends of the cable are attached, said key bolt adapted to be rotated to draw the cable taut and thus secure the coil spring firmly on the wheel and a lock washer U-shape in cross section and provided with a hexagonal hole in the center thereof, said lock washer adapted to be positioned on the inner end of the key bolt with the legs thereof engaging the sides of the felly to hold the key bolt in adjusted position.

REINHARD W. ELAND.

Witnesses:
NAN H. BROWN,
U. A. SCREECHFIELD.